United States Patent Office 3,196,028
Patented July 20, 1965

3,196,028
COMPOSITE NICKEL TITANATE-SILICA PARTICLES
Erich K. Zimmermann, Ridgewood, N.J., and Adrian R. Pitrot, Uniondale, N.Y., assignors to National Lead Company, New York, N.Y., a corporation of New Jersey
No Drawing. Filed Jan. 31, 1962, Ser. No. 170,265
14 Claims. (Cl. 106—303)

This invention relates to a composite nickel titanate-silica particle. In particular, this invention relates to composite nickel titanate-silica particles, and a process of manufacture thereof.

Nickel titanate has long been considered a pigment having excellent properties such as great stability to light, good tinting strength, very high covering power and a very desirable yellow color suitable for use in a finish coat paint. Nickel titanate as such, however, has not achieved wide usage inasmuch as the materials needed for its production prohibit its wide acceptance due to the high and restrictive costs. It has been found that this disadvantage can be overcome by more efficient utilization of the nickel titanate, inasmuch as in a pigment consisting entirely of nickel titanate particles, only the surface of each particle is utilized, the core of the particle contributing little or nothing to the color of the particle and consequently to the color of the paint film. Heretofore, it has been necessary to use an excess of nickel titanate to achieve the desired results. If a diluted or extended pigment was desired, extenders such as finely divided silica, magnesium silicate or the like were added. However, the extender pigment contributes little to the quality of the paint and has the undesirable effect of lowering the hiding power.

An object of this invention therefore, is to provide an extended nickel titanate pigment. Another object is to provide a silica-cored nickel titanate pigment. Another object is to provide a pigment containing a substantial proportion of silica without the normal deleterious effects of such silica on the pigment properties. Another object is to provide a more economical nickel titanate particle of good quality. A further object is to provide a process of manufacture of a silica-cored nickel titanate particle. Other objects and advantages will become apparent from the following more complete description and claims.

Broadly, this invention contemplates a new composition of matter comprising particles of silica coated with oxidic compounds of nickel, titanium and antimony. This invention also contemplates a pigmentary composition comprising particles of silica coated with cocalcined oxidic compounds of nickel, titanium and antimony. This invention also contemplates a paint composition comprising as pigment therefore, particles of silica coated with oxidic compounds of nickel, titanium and antimony. This invention further contemplates a process for the manufacture of silica-cored nickel titanate particle which comprises the steps of mixing finely divided silica with oxidic compounds of antimony, nickel and titanium and calcining this mixture at an elevated temperature.

In a particularly desirable embodiment, this invention contemplates a new composition of matter comprising particles of silica coated with oxidic compounds of nickel, titanium and antimony, wherein said silica is present from about 25% to 75%, said nickel compound expressed as NiO is present from about 1.0% to about 8.0%, said titanium compound expressed as $TiO_2$ is present from about 10% to about 65%, and said antimony compound expressed as $Sb_2O_4$ is present from about 2.0% to about 40%, in which all percentages are based on the total weight of said silica and oxidic compounds of nickel, titanium and antimony.

The compositions contemplated by this invention may be prepared by calcining finely-divided silica with an oxidic compound of nickel, titanium and antimony. By the term "oxidic compound" we mean an oxide or compound which upon calcination yields an oxide—for example a hydroxide, an inorganic salt, an organic acid salt or the like. Preferably we use nickel carbonate, titanium dioxide and antimony trioxide.

The silica core may be any finely-divided silica, preferably having an average particle size of from about 3 to 8 microns in diameter, and may be prepared by precipitation from a silicate solution, by ignition of organo-silica compounds, by combustion of volatile compounds such as $SiCl_4$, or in other ways which will be obvious to those skilled in the art. For economy and simplicity however, we prefer to employ finely-divided native silica. The silica may be ground and then blended with the oxidic compounds of nickel, titanium, and antimony or ground with them, for example in a ball mill. In either method, it is believed that the grinding activates the surface of the silica making it receptive to the fine particles of oxide or oxides. The length of time for the grinding will vary according to the particular conditions employed, but usually it will be for commercial silica flours from about 16 to 24 hours. Below 16 hours, the surface of the silica is not sufficiently activated and an incomplete coating is produced. There is ordinarily no advantage in employing a grinding time of more than 24 hours. It is preferred however to employ a grinding time of about 16 to 20 hours, as this has been found to produce better results.

The calcination step performs two functions. First, it forms a physico-chemical bond of the metal oxide coating materials to the surface of the silica thereby forming a permanently coated product and secondly it includes interaction between the coating oxides, that is the nickel and titanium compounds thereby forming nickel titanate and in addition, if desired, the conversion of antimony trioxide to form antimony tetroxide depending in part on the calcination temperature and the proportions of coating oxides present. A preferred method for the preparation of the silica-cored nickel titanate pigment, as mentioned above, is the conversion of the antimony trioxide to the higher antimony oxide in situ during the heating or calcination step. However, it has been found that the higher antimony oxide may be prepared prior to its introduction into the blend of coating oxides with equally effective results. The calcination temperature should be between about 1000° C. and 1400° C., and for a length of time of between about 1 and 3 hours. Although some variation in these conditions is permissible, over calcination should be avoided because it leads to agglomeration and particle growth, resulting in a gritty pigment possessing poor pigmentary properties. Under calcination on the other hand results in incomplete reaction, a poor adherence of the coating to the silica core and lack of color development.

The relative proportions of silica, nickel, titanium and antimony expressed as the oxides in the contemplated invention should be within the following ranges:

| | Percent |
|---|---|
| $SiO_2$ | 25–75 |
| NiO | 1–8 |
| $TiO_2$ | 10–65 |
| $Sb_2O_4$ | 2–40 |

Pigments containing greater than 75% silica show limited effectiveness because of insufficient coating of the particle. Similarly, pigments containing less than 25% silica yield products that are more expensive without a compensating increase in effectiveness. It is preferred, for paint purposes, to have approximately equal proportions of silica and the coloring pigment as these amounts produce a most desirable coating, however, the thickness of the coating may be varied according to the requirements by varying the percent silica and coating material used.

The color and hue of the silica-cored nickel titanate pigment may be easily adjusted to meet a variety of requirements, for example, pigments low in antimony will yield a cream or beige color whereas those high in antimony approach the yellow greens. In the intermediate ranges, the pigment is possessed of a brilliant golden yellow color. In our most desirable embodiment the optimum color and strength was found to be a particle composed of 38.7% titanium dioxide, 7.9% antimony tetroxide, from 3 to 4% nickel oxide and the balance silica which is present in the core of the material. Further variations, in addition to those heretofore mentioned, in the composition of the pigment coating may consist of the introduction of other metal oxides such as lead oxide, calcium oxide, zinc oxide, stannic oxide, vanadium pentoxide, tungsten trioxide, molybdenum trioxide, etc. These addition oxides, if desired in the final product, can be introduced into the oxide blend prior to calcination so as to form an integral component of the final product. The selection of these addition oxides can be left to the discretion of the formulator, so as to realize the best combination of properties that meet his requirement.

In order to more fully illustrate the nature of this invention and the manner of practicing the same, the following examples are presented.

Example I 1000 grams of silica were ground in a 4 gallon porcelain mill with 2135 ml. of water and 20 pounds of pebbles for 16 hours. The charge was transferred to a 12″ x 18″ "Pyrex" jar equipped with an agitator and a means of heating. Then 251 grams of nickel sulfate solution containing 9.37% nickel were added. While agitating, a water solution of 56 grams of sodium carbonate was added. The slurry was then filtered and washed in the funnel with five 500 ml. portions of water. The filter cake was then repulped with a total of 6 liters of water and 149.6 grams of antimony trioxide and 774 grams of titanium dioxide were added. This slurry was then filtered and dried. The product was calcined in clay dishes in a furnace at 500° C. for 16 hours and at 1250° C. for two hours. The calcined product was wet milled in a porcelain pebble mill, dried and passed thru a 30 mesh screen. The composition of this product was 51.1% $SiO_2$, 39.5% $TiO_2$, 7.9% $Sb_2O_4$ and 1.5% NiO based on the weight of the particle. In addition the product possessed an excellent yellow color when mulled in linseed oil.

Example II 1000 grams of silica were ground in a 4 gallon porcelain mill with 2135 ml. of water and 20 pounds of pebbles for 16 hours. The charge was transferred to a 12″ x 18″ "Pyrex" jar equipped with an agitator and a means of heating. Then 502.7 grams of nickel sulfate solution containing 9.37% nickel were added. While agitating, a water solution of 112 grams of sodium carbonate was added. The slurry was then filtered and washed in the funnel with five 500 ml. portions of water. The filter cake was then repulped with a total of 6 liters of water and 149.6 grams of antimony trioxide and 774 grams of titanium dioxide were added. The slurry was then filtered and dried. The product was calcined in clay dishes in a furnace at 500° C. for 16 hours and at a temperature of 1250° C. for two hours. The calcined product was wet milled in a porcelain pebble mill, dried and passed thru a 30 mesh screen. The composition of this product was 50.2% $SiO_2$, 38.9% $TiO_2$, 7.9% $Sb_2O_4$ and 3.0% NiO based on the weight of the particle. The product possessed an excellent yellow color when mulled in linseed oil.

Example III 1000 grams of silica were ground in a 4 gallon porcelain mill with 2135 ml. of water and 20 pounds of pebbles for 16 hours. The charge was transferred to a 12″ x 18″ "Pyrex" jar equipped with an agitator and a means of heating. Then 677.9 grams of nickel sulfate solution containing 9.37% nickel were added. While agitating, a water solution of 151.2 grams of sodium carbonate was added. The slurry was then filtered and washed in the funnel with five 500 ml. portions of water. The filter cake was then repulped with a total of 6 liters of water and 447.8 grams of antimony trioxide and 442.4 grams of titanium dioxide were added. This slurry was then filtered and dried. The product was calcined in clay dishes in a furnace at 500° C. for 16 hours and at a temperature of 1250° C. for 2 hours. The calcined product was wet milled in a porcelain pebble mill, dried and passed thru a 30 mesh screen. The composition of this product was 50.1% silica, 22.2% $TiO_2$, 23.7% $Sb_2O_4$, and 4.0% NiO, based on the weight of the particle. The product was characterized by a slight greenish-yellow color when mulled in linseed oil.

Example IV

Example IV was prepared in a similar manner as to Example III except that 302.2 grams of antimony trioxide and 604.0 grams of titanium dioxide were added. The composition of this product was 50.0% silica, 30.1% $TiO_2$, 15.9% $Sb_2O_4$ and 4.0% NiO. The product was distinguished by a slight greenish-yellow color when mulled in linseed oil.

Example V

Example V was prepared in a similar manner as to Example III except that 72.8 grams of antimony trioxide and 858.6 grams of titanium dioxide were added. The composition of this product was 49.6% silica, 42.6% $TiO_2$, 3.8% $Sb_2O_4$ and 4.0% NiO. The product was characterized by a beige-yellow color when mulled in linseed oil.

Example VI

Example VI was prepared in a similar manner as to Example III except that 38.2 grams of antimony trioxide and 897.0 grams of titanium dioxide were added. The composition of this product was 49.6% silica, 44.4% $TiO_2$, 2.0% $Sb_2O_4$ and 4.0% NiO. The product was characterized by a beige-yellow color when mulled in linseed oil.

Example VII

Example VII was prepared in a similar manner as to Example III except that 111.0 grams of antimony trioxide and 816.2 grams of titanium dioxide were added. The composition of this product was 49.7% silica, 40.5% $TiO_2$, 5.8% $Sb_2O_4$ and 4.0% NiO. The product possessed a good yellow color when mulled in linseed oil.

Example VIII

Example VIII was prepared in a similar manner as to Example III except than 187.5 grams of antimony trioxide and 731.3 grams of titanium dioxide were added. The composition of this product was 49.8% silica, 36.4% $TiO_2$, 9.8% $Sb_2O_4$ and 4.0% NiO. The product was distinguished by a slight greenish-yellow color when mulled in linseed oil.

Example IX

Example IX was prepared in a similar manner as to Example III except that 149.3 grams of antimony trioxide and 773.7 grams of titanium dioxide were added. The composition of this product was 49.7% silica, 38.5% $TiO_2$, 7.8% $Sb_2O_4$ and 4.0% NiO. The product possessed an excellent yellow color when mulled in linseed oil.

Example X

Example X was prepared in a similar manner as to Example III except that 1339.7 grams of nickel sulfate, 298.9 grams of sodium carbonate, 149.6 grams of antimony trioxide and 775.2 grams of titanium dioxide were added. The composition of this product was 47.8% silica, 37.1% $TiO_2$, 7.5% $Sb_2O_4$ and 7.6% NiO. The product possessed a good yellow color when mulled in linseed oil.

Example XI 3415.9 grams of silica were ground in a 4 gallon porcelain mill with 2135 ml. of water and 20 pounds of pebbles for 16 hours. The charge was then transferred with water to a storage jar. 1130.2 grams of this silica slurry containing 500 grams of silica was transferred to a jar to which was added 125.9 grams of nickel sulfate solution containing 15.0 grams of NiO and 141 ml. of sodium carbonate solution containing 28.2 grams of sodium carbonate. Thereafter 83 grams of antimony trioxide and 26.7 grams of calcium carbonate were added. This slurry was repeatedly filtered and washed and finally dried. The dried material was calcined by first heating at 500° C. and finally at 1250° C. for 2 hours. The calcined product was wet milled in a porcelain pebble mill, dried and passed thru a 30 mesh screen. The composition of this product was 73.5% silica, 10.5% $TiO_2$, 11.6% $Sb_2O_4$, 2.2% NiO and 2.2% CaO. The product possessed a slight greenish-yellow color when mulled in linseed oil.

Example XII

Example XII was prepared in a similar manner as to Example II except that one-half of the nickel oxide content was replaced with lead oxide. The composition of this product was 50.2% silica, 38.9% $TiO_2$, 7.9% $Sb_2O_4$, 1.5% PbO and 1.5% NiO. The product possessed a good yellow color when mulled in linseed oil.

The silica cored nickel titanate pigment was evaluated to determine its effectiveness in paint compositions. The results showed that the pigment had good mass tone and hiding power qualities when evaluated in a paint composed of an alkyd resin vehicle. Comparative tests using the cored pigment as compared to a commercial nickel titanate pigment on an equal basis showed the cored product to be superior in tinting strength and light stability. On a colorant weight basis the cored product was 12½% stronger than the standard nickel titanate on tinting strength. The light stability tests revealed that the standard nickel titanate darkened on both the mass tone and tinted films whereas the silica-cored product had not after an exposure of 48 hours. The light stability exposure tests were conducted in a Fade-O-meter where the panel temperatures were 120° F.

The foregoing examples illustrate specific embodiments of the instant invention. The paint composition employing our novel invention is merely illustrative of the wide variety capable of being utilized. A large selection of resins, vehicles, active pigments, extender pigments, etc., may also be employed in these compositions as will be understood by those skilled in the art.

While this invention has been described and illustrated by the examples shown, it is not intended to be strictly limited thereto and other modifications may be employed within the limits of the following claims.

We claim:

1. A new composition of matter consisting essentially of oxidic compounds of nickel, titanium and antimony coated on a particle of silica, wherein said silica is present from about 25% to about 75%, said nickel compound expressed as NiO is present from about 1% to about 8%, said titanium compound expressed as $TiO_2$ is present from about 10% to about 65% and said antimony compound expressed as $Sb_2O_4$ is present from about 2% to about 40%, in which all percentages are based on the total weight of said silica and oxidic compounds of nickel, titanium and antimony.

2. A new composition of matter according to claim 1 wherein said oxidic compounds also include an oxidic compound of lead, said lead compound present in an amount not exceeding 2.5%.

3. A new composition of matter according to claim 1 wherein said oxidic compounds also include an oxidic compound of calcium, said calcium compound present in an amount not exceeding 2.5%.

4. A new composition of matter according to claim 1 wherein said oxidic compounds also include an oxidic compound of zinc, said zinc compound present in an amount not exceeding 2.5%.

5. A new composition of matter according to claim 1 wherein said oxidic compounds also include an oxidic compound of tungsten, said tungsten compound present in an amount not exceeding 2.5%.

6. A new composition of matter according to claim 1 wherein said oxidic compounds also include an oxidic compound of molybdenum, said molybdenum compound present in an amount not exceeding 2.5%.

7. A paint composition comprising as pigment therefor, oxidic compounds of nickel, titanium and antimony coated on particles of silica, wherein said silica is present from about 25% to about 75%, said nickel compound expressed as NiO is present from about 1% to about 8%, said titanium compound expressed as $TiO_2$ is present from about 10% to about 65% and said antimony compound expressed as $Sb_2O_4$ is present from about 2% to about 40%, in which all percentages are based on the total weight of said silica and oxidic compounds of nickel, titanium and antimony.

8. A paint composition according to claim 7 wherein said oxidic compounds include an oxidic compound of lead, said lead compound present in an amount not exceeding 2.5%.

9. A paint composition according to claim 7 wherein said oxidic compounds include an oxidic compound of calcium, said calcium compound present in an amount not exceeding 2.5%.

10. A paint composition according to claim 7 wherein said oxidic compounds include an oxidic compound of zinc, said zinc compound present in an amount not exceeding 2.5%.

11. A paint composition according to claim 7 wherein said oxidic compounds include an oxidic compound of tungsten, said tungsten compound present in an amount not exceeding 2.5%.

12. A paint composition according to claim 7 wherein said oxidic compounds include an oxidic compound of molybdenum, said molybdenum compound present in an amount not exceeding 2.5%.

13. A process for the manufacture of a silica-cored nickel titanate particle which comprises the steps of bringing into intimate contact finely divided silica with oxidic compounds of antimony, nickel and titanium and calcining this mixture at an elevated temperature of from about 1000° C. to about 1400° C. wherein said silica is present from about 25% to about 75%, said nickel compound expressed as NiO is present from about 1% to about 8%, said titanium compound expressed as TiO$_2$ is present from about 10% to about 65% and said antimony compound expressed as Sb$_2$O$_4$ is present from about 2% to about 40%, all percentages expressed by weight.

14. A process for the manufacture of a silica-cored nickel titanate particle according to claim 13, wherein oxidic compounds of the metals selected from the group consisting of lead, calcium, zinc, tungsten and molybdenum are present in an amount not exceeding 2.5% during calcination.

References Cited by the Examiner
UNITED STATES PATENTS

| | | | |
|---|---|---|---|
| 3,004,857 | 10/61 | Merson et al. | 106—296 |
| 3,022,186 | 2/62 | Hund | 106—300 |

TOBIAS E. LEVOW, *Primary Examiner.*